US006931201B2

(12) United States Patent
Obrador

(10) Patent No.: US 6,931,201 B2
(45) Date of Patent: Aug. 16, 2005

(54) VIDEO INDEXING USING HIGH QUALITY SOUND

(75) Inventor: Pere Obrador, Mountain View, CA (US)

(73) Assignee: Hewlett-Packard Development Company, L.P., Houton, TX (US)

(*) Notice: Subject to any disclaimer, the term of this patent is extended or adjusted under 35 U.S.C. 154(b) by 913 days.

(21) Appl. No.: 09/917,651

(22) Filed: Jul. 31, 2001

(65) Prior Publication Data

US 2003/0031460 A1 Feb. 13, 2003

(51) Int. Cl.[7] .............................. H04N 5/85; H04N 5/91
(52) U.S. Cl. ........................... 386/125; 386/75; 386/68
(58) Field of Search .................................. 386/125, 124, 386/105, 106, 107, 117, 46, 52, 68, 70, 69, 75, 82; H04N 5/85, 5/91

(56) References Cited

U.S. PATENT DOCUMENTS

| 5,655,117 A | 8/1997 | Goldberg et al. ........... 395/613 |
| 5,748,842 A | 5/1998 | Holmes et al. |
| 6,084,169 A | 7/2000 | Hasegawa et al. ............ 84/600 |
| 6,792,411 B1 * | 9/2004 | Massey, Jr. .................. 705/35 |
| 2002/0118949 A1 * | 8/2002 | Jones et al. .................... 386/68 |

FOREIGN PATENT DOCUMENTS

| EP | 0660249 | 6/1995 |
| EP | 1089279 | 4/2001 |
| WO | WO9946702 | 9/1999 |

OTHER PUBLICATIONS

Stephen W. Smoliar, et al., "Content–Based Video Indexing and Retrieval", Summer 1994, IEEE MultiMedia, P.P. 62–72.

F. Arman, et al., "Content–Based Browsing of Video Sequences", Oct. 1994, Multimedia 94, San Francisco, CA, P.P. 97–103.

* cited by examiner

*Primary Examiner*—Robert Chevalier

(57) ABSTRACT

A method for video indexing using high quality audio clips enables a user to acquire high quality audio clips during an audio/video sequence recording so that the user can selectively view the audio/video sequence using the high quality audio clips as video indices. Using the high quality audio clips as video indices enables the user to easily index the audio/video sequence using the most memorable pieces of music. In addition, the most memorable pieces of music contained in the high quality audio clips can be enjoyed (viewed and listened) in high quality audio, for example, with stereo sound, high dynamic range, noise suppression, or without psycho-acoustic compression.

20 Claims, 4 Drawing Sheets

VIDEO INDEXING USING HIGH QUALITY SOUND

TECHNICAL FIELD

The technical field relates to video imaging system, and, in particular, to video indexing system.

BACKGROUND

Users are increasingly using video cameras to record home videos, television programs, movies, concerts, or sports events on a disk or DVD for later or repeated viewing. A video camera typically records both video and audio to generate a video sequence, which can be stored in a secondary storage, such as a hard disk or a CD-ROM. Such video sequences typically have varied content or great length. Since a user normally cannot write down what is on a video sequence or where on an audio/video sequence particular scenes, movies, events are recorded, the user may have to sit and view an entire video sequence to remember what was recorded or to retrieve a particular scene. Video indexing allows a user to have easy access to different sections of the video sequence so that the user do not need to fast forward through the whole video sequence.

Current video indexing devices use video content analysis that automatically or semi-automatically extracts structure and meaning from visual cues in a video. After, for example, a video clip is taken from a television (TV) program or a home video, a computer will generate particular indexes so that a user can jump to a particular section in the video sequence.

However, automatic video indexing needs extensive processing in order to generate some key frames that, later on, the user may use as video indices. This extensive processing involves automatic searching for shot changes, scene changes, and ultimately, frames that may serve as key-frames. In addition, automatic video indexing may or may not help a user find a particular video event within a recording.

SUMMARY

A method for video indexing using high quality audio clips includes acquiring high quality audio clips during an audio/video sequence recording using an audio/video acquisition device, processing and transmitting the audio/video sequence and the high quality audio clips using a joint audio/video processing pipeline, and indexing the audio/video sequence using the high quality audio clips, so that a user can selectively view the audio/video sequence using the high quality audio clips as video indices. A computer-readable media may include instructions for controlling a computer to perform the method.

Using the high quality audio clips as video indices enables the user to easily index the audio/video sequence using, for example, the most memorable pieces of music, which the user has recorded with high quality sound. In addition, the most memorable segments corresponding to the pieces of music contained in the high quality audio clips can be enjoyed in high quality audio, for example, with stereo sound, high dynamic range, noise suppression, or without psycho-acoustic compression.

DESCRIPTION OF THE DRAWINGS

The preferred embodiments of the method for video indexing using high quality audio clips will be described in detail with reference to the following figures, in which like numerals refer to like elements, and wherein.

DETAILED DESCRIPTION

Figure 1:
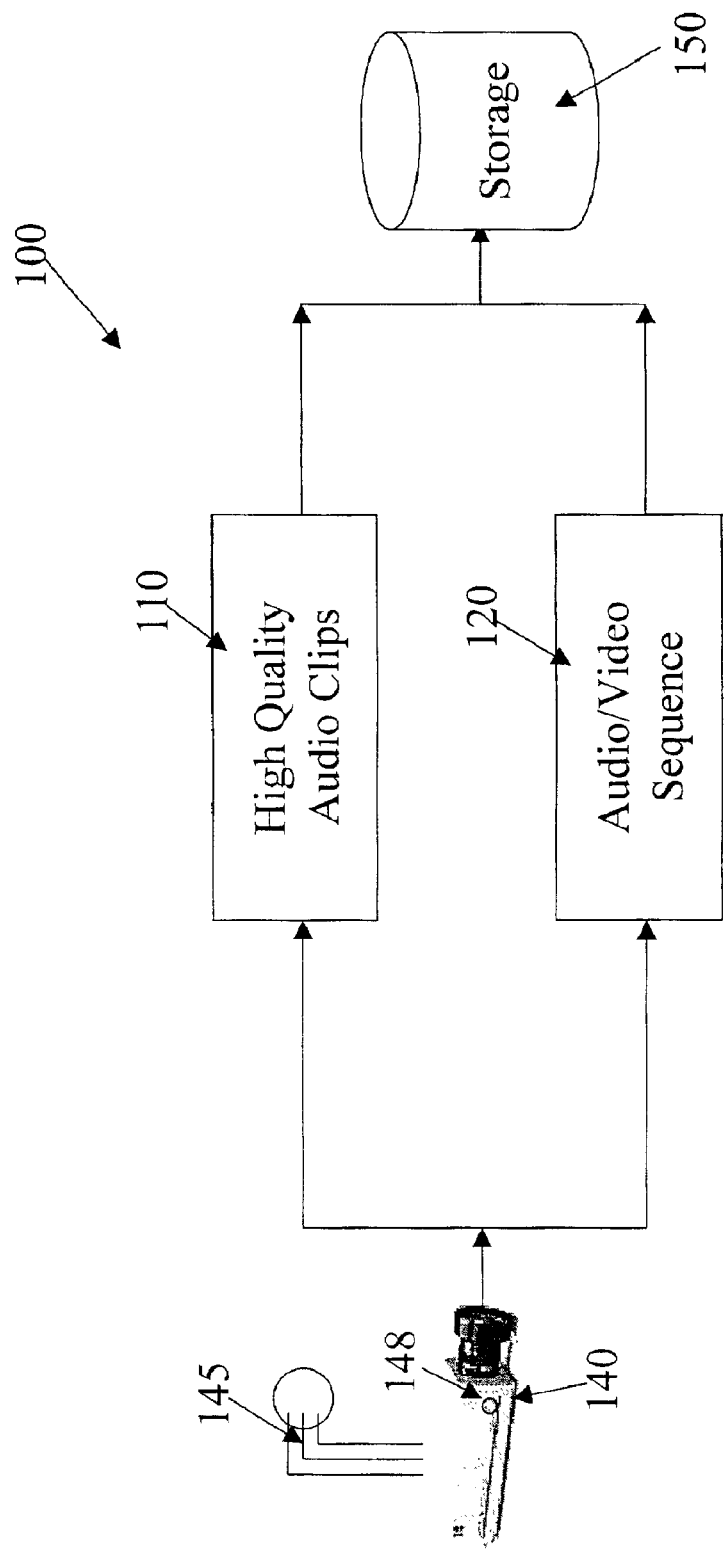
FIG. 1 illustrates an exemplary audio/video acquisition device capable of processing, transmitting, and/or storing an audio/video sequence and high quality audio clips in parallel.

Using a joint audio/video processing pipeline, an audio/video acquisition device, such as a video camera, may acquire high quality audio clips at the same time as audio/video sequence recording (in which the audio is usually low quality).

The high quality audio clips may be played alone, or along with the associated audio/video sequence, or any other multimedia content acquired during the audio/video sequence recording. Alternatively, the high quality audio clips may be used to index the audio/video sequence, which is then viewed with either high quality audio or low quality audio. If a user records an audio piece in high quality, such as in high dynamic range uncompressed stereo sound or surround sound, the user typically has a special interest in the particular audio piece. Linking the high quality audio piece to the associated audio/video sequence enables the audio/video sequence to be indexed effectively and/or to be viewed with high quality audio.

Indexing may be performed using, for example, an associated Extended Mark-up Language (XML) file, which links files regarding the high quality audio clip and the audio/video sequence with a particular time stamp or frame number corresponding to the beginning of the high quality audio clip within the audio/video sequence file.

The following is an exemplary XML file that performs the video indexing.

```
<?xml version="1.0" encoding="iso-8859-1" ?>
<!DOCTYPE VIDEO-INDEXING "video_indexing.dtd">
<audioVideoFile>
...
</audioVideoFile>
<highQualityAudioClips>
    <clip>
        <clipName> ... </clipName>
        <frameIndex> ... </frameIndex>
    </clip>
    <clip>
        <clipName> ... </clipName>
        <frameIndex> ... </frameIndex>
    </clip>
    .
    .
    .
    <clip>
        <clipName> ... </clipName>
        <frameIndex> ... </frameIndex>
    </clip>
</highQualityAudioClips>
```

Accordingly, a single XML file stores all information regarding the audio/video sequence and the high quality audio clips, along with the frame position (or time stamp) to which each high quality audio clip is linked, i.e., indexing information.

Alternatively, the indexing information may be embedded within the header of the high quality audio clip file, eliminating the need for an external indexing file. The high quality audio clips are typically encoded with 1 (mono)—32 (stereo) bits per sample when no compression is performed, which occupies much more storage space than the regular or low quality audio sounds. By selecting and recording high quality audio clips to capture memorable pieces of music, the user is able to jump directly to the beginning of the associated audio/video sequence because the system has read the indexing information from the XML file.

A joint audio/video processing pipeline for low quality audio and high quality audio may be used to implement the simultaneous acquisition of the audio/video sequence and the high quality audio clips. The joint audio/video processing pipeline technology is described, for example, in the motion Moving Picture Experts Group (MPEG)-1 audio standard (ISO/IEC 11172-3), which is incorporated herein by reference. MPEG-1 (ISO/IEC 11172-3 provides single-channel ("mono") and two-channel ("stereo" or dual mono") coding of digitized sound waves at 32, 44.1, and 48 kHz sampling rate. The predefined bit-rates range from 32 to 448 kbit/s for Layer I, from 32 to 384 kbit/s for Layer II, and from 32 to 320 kbit/s for Layer III. Any of these three layers may encode sound at different compression levels. For instance, MPEG-1 layer 3, also known as MP3, can record from 32 kbps up to 320 kbps, meaning that any MP3 recorder may record sounds at high quality (320 kbps) or very low quality (32 kbps). Similarly, any video camera that can record MPEG-1 video may vary the quality of the audio from one video clip to another video clip, provided the firmware on the camera supports the variation.

FIG. 1 illustrates an exemplary audio/video acquisition device 100, such as a video camera, that is capable of processing and transmitting an audio/video sequence 120 and high quality audio clips 110 in parallel, i.e., at the same time. The camera 100 uses an exemplary joint audio/video processing pipeline. The camera 100 includes an image/audio sensor 140, a processing pipeline for high quality audio clips 110, a processing pipeline for audio/video sequence 120, and a local storage 150. The sensor 140 may include one or more microphones 145 for receiving a particular audio clip in high quality audio, for example, in stereo sound or surround sound. The pipelines may be located on the camera's hardware/firmware, application specific integrated circuits (ASICs), microprocessor and/or digital signal processor. The local storage 150 may be a solid state memory, which is similar to SD Memory cards from Panasonic, or a microdrive, which is similar to microdrives hard drives from IBM. Using, for example, an audio record button 148, the sensor 140 of the camera 100 may record high quality audio clips 110 at the same time as acquiring an audio/video sequence 120. In other words, two different audio tracks may be acquired by the camera 100 at the same time, a low quality audio track that accompanies the audio/video sequence 120 recording and a high quality audio track.

After the audio/video sequence 120 and the high quality audio clips 110 are acquired, the audio/video sequence 120 and the high quality audio clips 110 may be processed at the same time using the joint audio/video processing pipeline, as shown in FIG. 1. Thereafter, the audio/video sequence 120 and the high quality audio clips 110 may be transmitted and stored in a local storage 150 on the camera 100. Alternatively, the audio/video sequence 120 and the high quality audio clips 110 may be stored in a remote storage on a server/computer, such as a hard disk, a CD-ROM, or a server connected to a network. The high quality audio clips 110 may be labeled, for example, as clip #1, clip #2, or clip #3, within the audio/video sequence 120. Audio recording, which is one-dimensional, typically does not occupy as much storage as image or video recording, which is three-dimensional (two-dimensional+time). Accordingly, each high quality audio clip 110 may last as long as the user desires.

Figure 2:
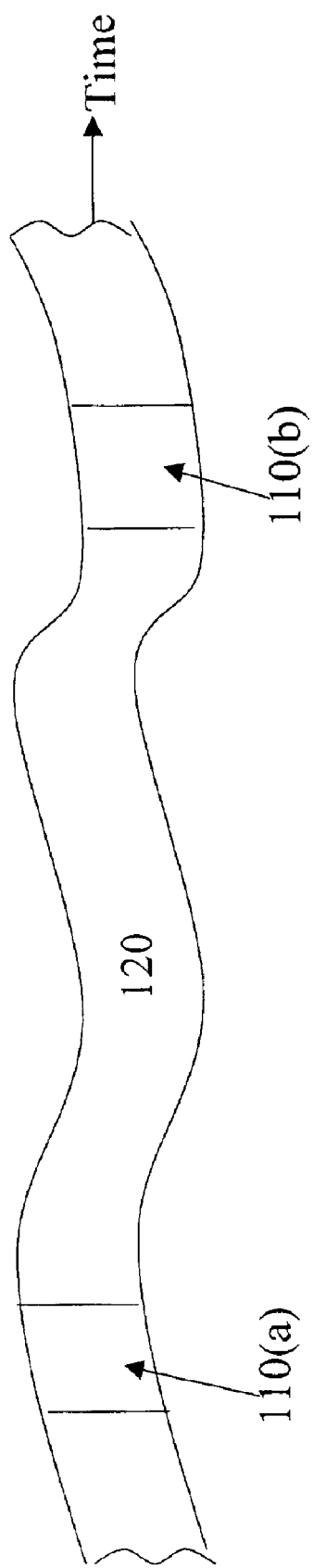
FIG. 2 illustrates an exemplary method for video indexing using high quality audio clips.

FIG. 2 illustrates an exemplary method for video indexing using high quality audio clips 110, typically recorded in stereo sound. As illustrated in FIG. 1, during an audio/video sequence 120 recording, high quality audio clips 110(a) and 110(b) may be acquired by a user, for example, by pressing an audio record button 148 on an audio/video acquisition device 140, such as a video camera. The high quality audio clips 110 may be considered as indices pointing into the audio/video sequence 120, and may be recorded in the associated XML file, as described above. Thereafter, the user may selectively view the audio/video sequence 120 using the high quality audio clips 110 as video indices. The high quality audio clips 110 typically capture memorable pieces of music of an event. Therefore, linking the most memorable pieces of music to points in time within the audio/video sequence 120 enables the user to relive memorable experiences around the high quality audio clips 110.

Video indexing is described, for example, in "Content-Based Browsing of Audio/video sequences" by Arman et al., ACM multimedia, pages 97–103, 1994; and "Content Based Video Indexing and Retrieval" by Smoliar et al., IEEE multimedia, pages 62–72, 1994, which are incorporated herein by reference. Arman et al. disclose a novel methodology to represent the contents of an audio/video sequence. The methodology uses a content-based browsing system that forms an abstraction to represent each shot of the sequence by using a representative frame, and allows a user to easily navigate the frame, i.e., rapidly view an audio/video sequence in order to find a particular point within the sequence. Smoliar et al. disclose a method for content-based video indexing and retrieval. The method includes parsing the video stream into generic clips, indexing the video clips when inserted into a database, and retrieval and browsing the database through queries based on text and/or visual examples.

For example, while recording an audio/video sequence 120 with regular or low quality audio during a piano competition, a parent may press an audio record button 148 on a camera 100 to record in high quality audio a piece of music 110(a) performed by his/her own child. Later, while still recording the piano competition, the parent may press the audio record button 148 again to capture another piece of music 110(b) played by, for example, the top performer, and so on. The high quality audio clips 110 recorded typically represent the most memorable moments of the event, but may alternatively represent any audio clip selected by a user. The parent may later selectively view the family video using the high quality audio clips 110 as video indices, i.e., proceed directly to the most memorable moments in the audio/video sequence 120. In addition, the parent can enjoy the music performance in high quality stereo sound, which is impossible with regular audio/video sequence 120 recording.

Figure 3:
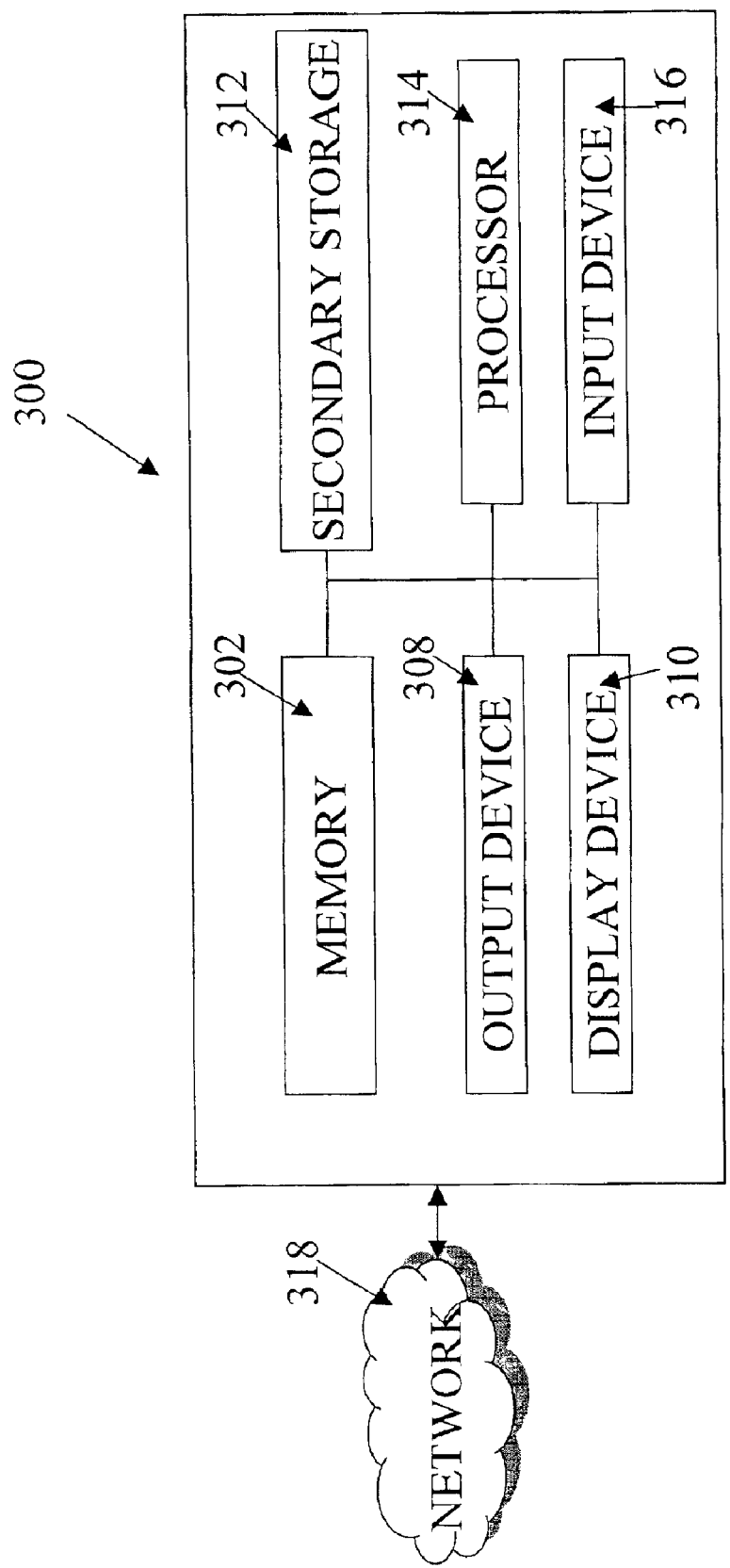
FIG. 3 illustrates an exemplary hardware components of a computer that may be used to in connection with the exemplary method of FIG. 2 for video indexing using high quality audio clips.

FIG. 3 illustrates an exemplary hardware components of a computer 300 that may be used to in connection with the exemplary method for video indexing using high quality audio clips 110. The computer 300 has a connection with a network 318, such as the Internet or other type of computer or telephone networks, for sending recorded video 120 and high quality audio clips 110 to friends and family by, for example, email. The computer 300 typically includes a memory 302, a secondary storage device 312, a processor 314, an input device 316, a display device 310, and an output device 308.

The memory 302 may include random access memory (RAM) or similar types of memory. The secondary storage device 312 may include a hard disk drive, floppy disk drive, CD-ROM drive, or other types of non-volatile data storage. The secondary storage device 312 may correspond with various databases or other resources. The processor 314 may execute applications or other information stored in the memory 302, the secondary storage 312, or received from the Internet or other network 318. The input device 316 may include any device for entering data into the computer 300, such as a keyboard, key pad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 300 to perform a particular method.

After the audio/video sequence 120 and the high quality audio clips 110 are acquired by the camera 100, the audio/video sequence 120 and the high quality audio clips 110 may be downloaded to a computer 300 either by transmitting over wireless channels or through a wired connection, such as universal serial bus (USB) or Firewire (IEEE 1394). Alternatively, the computer 300 may read the local storage 150 of the camera 300 by directly connecting to a reader of the computer 300. After downloading the recorded audio/video sequence 120 and the high quality audio clips 110, the audio/video sequence 120 may be played back either on a liquid crystal display (LCD) (not shown) of the camera 100 or on a display device 310 of the computer 300 or any other associated display device. The LCD or the display device 310 may display the high quality audio clips 110 as labeled icons, for example, clip #1, clip #2, or clip #3. A particular high quality audio clip 110, for example, clip #1, may be played in stereo sound by clicking on the corresponding icon as displayed on the display device 310. The high quality audio clips 110 may be played stand alone, or along with the associated audio/video sequence 120, or any other multimedia content acquired during the time of recording.

Alternatively, the high quality audio clips 110 may be used to index the audio/video sequence 120, which is then viewed with either high quality audio or low quality audio. For example, when viewing a recorded audio/video sequence 120 using a computer 300, a user may double click on one of the icons, for example, clip #2, and start viewing the audio/video sequence 120 from a point in time associated with the high quality audio clip #2. By linking the most memorable pieces of music to points in time within the audio/video sequence 120, the user may easily index the audio/video sequence 120 using the most memorable high quality audio clips 110. Such feature is especially valuable when video recording a concert or a music performance since the most memorable pieces of music performance can be enjoyed in high quality stereo sound.

The audio/video sequence 120 and the high quality audio clips 110 may also be saved on a server connected to the network 318, to be retrieved by other users. Alternatively, the audio/video sequence 120 and the high quality clips 110 may be transmitted to other users through the network 318 or other communications channel by, for example, e-mail. A friend or a family member who receives the audio/video sequence 120 and the high quality audio clips 110 may then selectively view the audio/video sequence 120 using the high quality audio clips 110 as video indices.

Figure 4:
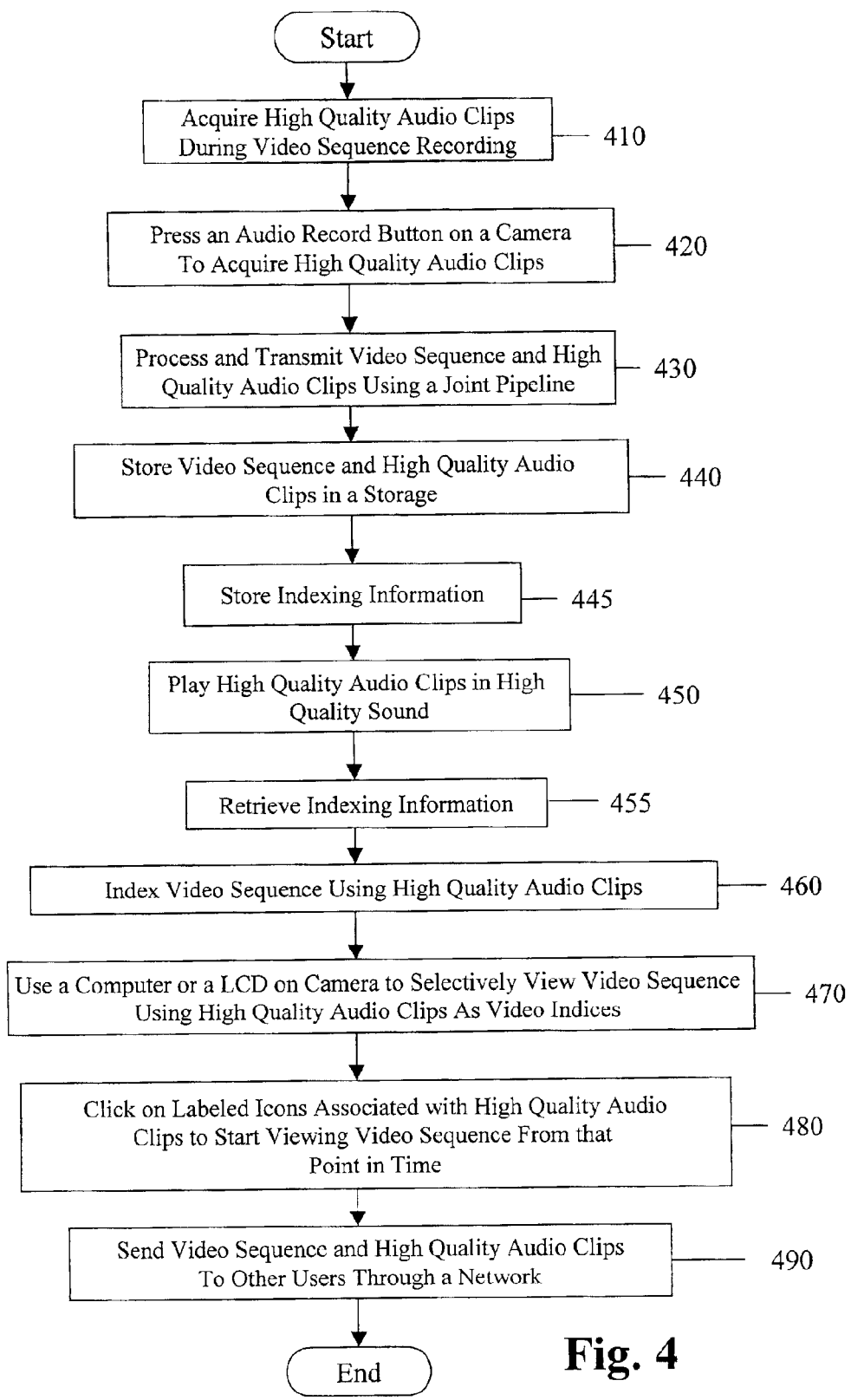
FIG. 4 is a flow chart illustrating the exemplary method of FIG. 2 for video indexing using high quality audio clips.

FIG. 4 is a flow chart illustrating the exemplary method for video indexing using high quality audio clips 110. An audio/video acquisition device 100, such as a video camera, enables a user to acquire high quality audio clips 110 during an audio/video sequence 120 recording, step 410. The high quality audio clips 110 may be acquired during the audio/video sequence 120 recording using, for example, an audio record button 148, on the camera 100, step 420. Next, the audio/video sequence 120 and the high quality audio clips 110 may be processed using a joint audio/video processing pipeline, step 430. An XML indexing file may be generated in the process.

The audio/video sequence 120, the high quality audio clips 110, and the XML indexing file containing the indexing information, may be transmitted and stored in a local storage 150 or a remote storage, steps 440 and 445. The high quality audio clips 110 may be played in high quality stereo sound, either stand alone or along with the associated audio/video sequence or any other multimedia content acquired during the time of recording, step 450.

Alternatively, once the XML file has been retrieved and read by the display system, step 455, the high quality audio clips 110 may be used to index the audio/video sequence 120, step 460. A computer may be used to selectively view the audio/video sequence 120 using the high quality audio clips 110 as video indices, step 470. The user may click on a labeled icon associated with one of the high quality audio clips 110, or enter other types of commands using any input device, to start viewing the audio/video sequence 120 from a point in time associated with that high quality audio clip 110, step 480.

In addition, the audio/video sequence 120, the high quality audio clips 110 and the XML file may be sent through a network 318 to other users, such as friends and family, so that the other users may selectively view the audio/video sequence 120 using the high quality audio clips 110 as video indices, step 590.

While the method and apparatus for video indexing using high quality audio clips have been described in connection with an exemplary embodiment, those skilled in the art will understand that many modifications in light of these teachings are possible, and this application is intended to cover any variations thereof.

What is claimed is:

1. A method for video indexing using high quality audio clips, comprising:

acquiring high quality audio clips during an audio/video sequence recording using an audio/video acquisition device;

processing and transmitting the audio/video sequence and the high quality audio clips using a joint audio/video processing pipeline; and indexing the audio/video sequence using the high quality audio clips, wherein a user can selectively view the audio/video sequence using the high quality audio clips as video indices.

2. The method of claim 1, further comprising playing the high quality audio clips in high quality sound.

3. The method of claim 1, wherein the acquiring step includes acquiring the high quality audio clips during the audio/video sequence recording by receiving selection of a button on the audio/video acquisition device.

4. The method of claim 1, further comprising storing the audio/video sequence, the high quality audio clips, and indexing information in a storage.

5. The method of claim 4, wherein the storing step includes storing the audio/video sequence, the high quality audio clips, and the indexing information in a local storage on the audio/video acquisition device.

6. The method of claim 4, wherein the storing step includes storing the audio/video sequence, the high quality audio clips, and the indexing information on a computer connected to a network.

7. The method of claim 6, further comprising sending the audio/video sequence, the high quality audio clips, and the indexing information to other users through the network, whereby the other users can selectively view the audio/video sequence using the high quality audio clips as the video indices.

8. The method of claim 6, further comprising sending the audio/video sequence, the high quality audio clips, and the indexing information to other users through the network, whereby the other users can play the high quality audio clips in high quality stereo sound.

9. The method of claim 1, further comprising using a computer to selectively allowing viewing the audio/video sequence using the high quality audio clips as the video indices.

10. The method of claim 9, further comprises receiving selection of an icon associated with one of the high quality audio clips from the computer to start viewing the audio/video sequence from a point in time associated with the high quality audio clip.

11. An apparatus for video indexing using high quality audio clips, comprising:

an audio/video acquisition device capable of acquiring high quality audio clips during an audio/video sequence recording;

a joint pipeline capable of processing and transmitting the audio/video sequence and the high quality audio clips in parallel; and a storage capable of storing the audio/video sequence, the high quality audio clips, and indexing information for retrieval by a user, wherein the user can selectively view the audio/video sequence using the high quality audio clips as video indices.

12. The apparatus of claim 11, further comprising a computer that is used to selectively view the audio/video sequence using the high quality audio clips as the video indices.

13. The apparatus of claim 11, further comprising a network capable of sending the audio/video sequence, the high quality audio clips, and the indexing information to other users, whereby the other users can selectively view the audio/video sequence using the high quality audio clips as the video indices.

14. The apparatus of claim 12, wherein the storage is a computer connected to the network.

15. The apparatus of claim 11, wherein the audio/video acquisition device is a video camera.

16. The apparatus of claim 11, wherein the audio/video acquisition device further comprises one or more microphones for recording a particular audio clip in high quality audio sound during the audio/video sequence recording.

17. The apparatus of claim 11, wherein the audio/video acquisition device further comprises a button to be pressed for recording the high quality audio clips with the indexing information during the audio/video sequence recording.

18. A computer readable medium providing instructions for video indexing using high quality audio clips, the instructions comprising:

recording high quality audio clips along with an audio/video sequence and indexing information using a joint audio/video processing pipeline; and indexing the audio/video sequence using the high quality audio clips, whereby a user can selectively view the audio/video sequence using the high quality audio clips as video indices.

19. The computer readable medium of claim 18, further comprising instructions for displaying the high quality audio clips on a display device as labeled icons for easy indexing.

20. The computer readable medium of claim 17, further comprising instructions for sending the audio/video sequence, the high quality audio clips, and the indexing information to other users through a communications channel, whereby the other users can selectively view the audio/video sequence using the high quality audio clips as the video indices.

* * * * *